United States Patent [19]
Bouillon et al.

[11] 3,757,425
[45] Sept. 11, 1973

[54] APPARATUS FOR TESTING THE PROFILE AND THE PITCH OF INVOLUTE GEAR TEETH

[76] Inventors: Gratien Bouillon, 2571 Boul, Laurier, Quebec; Georges Tordion, 833 de Maure, Ste.-Foy, Quebec; Gilles Tremblay, 810 Painchaud, Quebec, Quebec, all of Canada

[22] Filed: Dec. 1, 1970

[21] Appl. No.: 94,103

[52] U.S. Cl. .......................................... 33/179.5 D
[51] Int. Cl. ............................................... G01b 7/28
[58] Field of Search ............... 33/179.5 A, 179.5 R, 33/179.5 D, 179.5 E

[56] References Cited
UNITED STATES PATENTS

| | | | |
|---|---|---|---|
| 2,381,975 | 8/1945 | Ernst | 33/179.5 A |
| 3,397,459 | 8/1968 | Ehrhardt | 33/179.5 D |
| 2,564,376 | 8/1951 | Schwartz et al. | 33/179.5 D |
| 2,787,060 | 4/1957 | Flair | 33/179.5 E |

*Primary Examiner*—Robert B. Hull
*Assistant Examiner*—Richard R. Stearns
*Attorney*—Raymond A. Robic

[57] ABSTRACT

An apparatus for testing simultaneously the profile and the pitch of an involute straight or helical gear tooth including means for pivoting an electrical gauge head contacting the involute gear tooth about a pivot point common to the base circle of the gear and a line tangent to such base circle and intersecting the pitch circle of said gear on the surface of the gear tooth being measured, thus causing the electrical gauge head to generate a first signal proportional to the difference between the actual profile of the involute gear tooth under test and the segment of a circle traced about the pivot point. Means are provided for generating a second signal proportional to the difference between the theoretical profile of the involute gear tooth and the segment of the circle traced about the pivot point. The above-mentioned first signal is subtracted from the second signal to provide a signal representing the true deviation of the profile of the involute gear tooth from the theoretical profile of the gear tooth.

13 Claims, 13 Drawing Figures

INVENTORS
Gratien BOUILLON
Georges TORDION
Gilles TREMBLAY

ATTORNEY

INVENTORS
Gratien BOUILLON
Georges TORDION
Gilles TREMBLAY

ATTORNEY

INVENTORS
Gratien BOUILLON
Georges TORDION
Gilles TREMBLAY

ATTORNEY

INVENTORS
Gratien BOUILLON
Georges TORDION
Gilles TREMBLAY

ATTORNEY

APPARATUS FOR TESTING THE PROFILE AND THE PITCH OF INVOLUTE GEAR TEETH

This invention relates to an apparatus for testing the profile and the pitch of an involute straight or helical gear tooth.

Various methods are known for testing the profile of an involute gear tooth. The commonly known methods include machines using individual base-circle discs or using a permanent built-in master base-circle disc and a proportional compensator. Machines using individual master involute profile or using a built-in master involute profile and a linkage have also been used for testing the profile of an involute gear tooth. Finally, optical mechines have also been used for projecting an image of enlarged size of the involute gear tooth and for comparing the enlarged image with a master involute profile.

However, it has been found in practice that it is very cumbersome to have individual base-circle discs or individual involute profiles for testing various sizes of gears. On the other hand, the machines using a master-base circle disc or a master involute profile and compensating linkages are complicated and costly especially when they are designed to test large gears.

It is therefore the object of the invention to provide an apparatus for testing involute gears which is simple as well as accurate. The apparatus of the invention is also easy to set into operation and requires a minimum of skill to properly adjust it.

The apparatus in accordance with the invention includes means for pivoting an electrical gauge head contacting the involute gear tooth about a pivot point common to the base-circle of the gear and a line tangent to such base-circle and intersecting the pitch circle of said gear on the surface of the gear tooth being measured, thus causing the gauge head to generate a first signal proportional to the difference between the profile and the involute gear tooth under test and the segment of a circle traced about the pivot point. Means are provided for generating a second signal proportional to the difference between the theoretical profile of the involute gear tooth and the segment of the circle traced about the pivot point. The above-mentioned first and second signals are subtracted from each other to provide a signal representing the true deviation of the profile of the involute gear tooth from the theoretical profile of the gear tooth.

The means for pivoting the gauge head about the above-mentioned pivot point includes a first arm having a length adjusted to the base-circle radius of the gear and adapted to be pivoted at one end at the center of the gear, a second arm pivotally attached to the first arm at such pivot point and carrying the gauge head which is located at a distance from the pivot point corresponding to the length of the generating line of the involute gear tooth at the pitch point thereof, and a micrometer associated with the first arm and adapted to pivot the second arm.

The means for generating the above-mentioned second signal may include a cam rotatable with the second arm and having a profile corresponding, for each degree of rotation of the second arm, to the difference between the theoretical profile of the involute gear tooth and the segment of the circle traced by the second arm, and a first displacement transducer adapted to contact such cam to generate the second signal.

The invention will now be disclosed with reference to a preferred embodiment of the invention and to the accompanying drawings in which.

Figure 1:
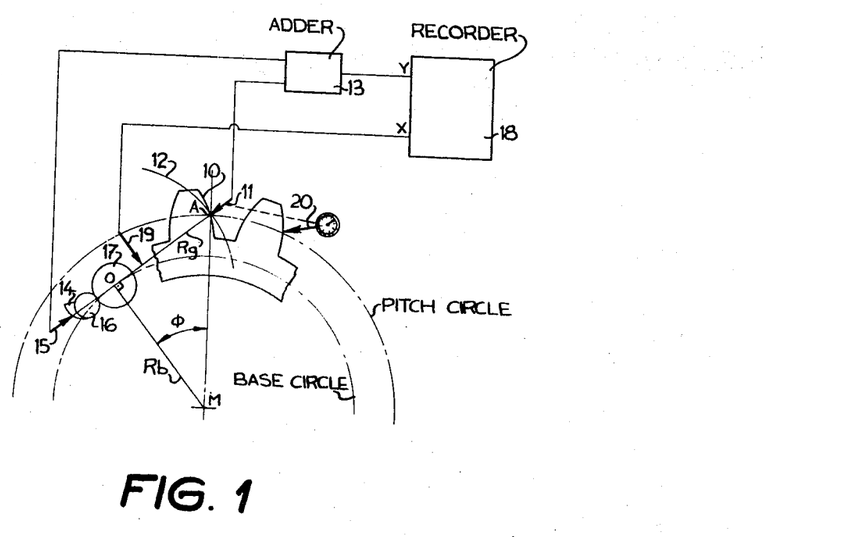
FIG. 1 illustrates a schematic diagram of the apparatus in accordance with the invention.

Referring to FIG. 1, if, according to a well known method of testing gear teeth, a straight edge is rolled on the so-called base-circle of the gear, each point of such straight edge will trace an involute line 10 which will correspond to the profile of the gear teeth. If A is a point of the involute line 10 on the so-called pitch circle, AO will be the generating line of the involute line 10 at point A.

The following description will refer to a number of terms which are peculiar to the manufacture of gears and reference is made to a textbook entitled "Gear Handbook" published by McGraw Hill Book Company for a definition of such terms, which terms are in accordance with the American Gear Manufacturers Association standards.

If, instead of rolling a straight edge on the base-circle, a gauge head 11 is rotated around point O and follows a path passing through point A, the normal path of such a measuring apparatus will be as indicated by reference numeral 12. If the gauge head is forced to follow the path of the involute line 10, it will generate an error signal to adding device 13. In accordance with the invention, the error detected by gauge head 11 is corrected by a compensating cam 14 contacted by a displacement transducer 15 which feeds a signal to the second terminal of adder 13. Cam 14 is connected to a gear 16 which is coupled to a larger gear 17. The reducing gears 16 and 17 permit the use of a larger cam to facilitate manufacturing of the cam and permit a greater accuracy of the measurements.

The output of adder 13 is fed to the Y terminal of a conventional X—Y recorder 18. The X terminal of the recorder is connected to a displacement transducer 19 which reads the angular displacement of the gauge head 11. As it will be explained more fully in a later part of the description, the cam 14, the gauge head 11 and the displacement transducer 15 are calibrated so that in the presence of a perfect involute profile 10, the line plotted by the recorder 18 is a straight line. However, if the profile measured differs from a perfect involute profile, the recorder 18 will record the error.

The diagram of FIG. 1 also indicates that the apparatus in accordance with the invention is equipped with a measuring apparatus 20 used as a stop or reference device to permit the measurement of the variation of the pitch of the gear teeth.

As commonly known, the base radius $Rb$ is a function of the number of teeth N of the gear, of its diametral pitch P and of the pressure angle $\phi$ at point A. Referring to FIG. 1, it will be found that:

$$Rb = OM = AM \cos \phi = (N/2P) \cos \phi$$

For example, if the pressure angle $\phi$ is 20°, it follows that:

$$Rb = (0.469845 N/P)$$

From the above it may be easily found that the length of the generating line at point A is:

$$Rg = AO = AM \sin \phi = (0.1710 lN/P)$$

Referring now to FIGS. 2 to 5, there will be illustrated the method of calculation of the compensating ) for the particular case of a 20° pressure angle full depth tooth. It is to be understood that the same method of calculation can be applied to any other pressure angle and depth of tooth. As it will be easily understood, the cam must be able to impart a displacement to transducer 15 which is proportional to the distance BC in FIG. 2, where B is a point located on involute line 10 and C a point located on circle 12 having center O and radius OA.

Figure 2:
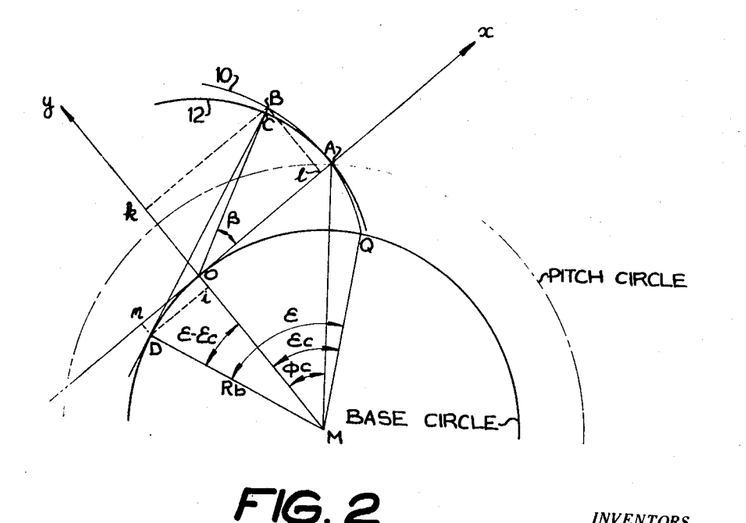
FIGS. 2 to 5 illustrate a method of calculating the dimensions of the cam used in the present invention.

If axis x and y are traced from point O, the coordinates of point B may be calculated as follows:

a. $x_B = Ol = nl - no = nl - Di$
$= BD \cos(\epsilon - \epsilon c) - Rb \sin(\epsilon - \epsilon c)$
$= \epsilon Rb \cos(\epsilon - \epsilon c) - Rb \sin(\epsilon - \epsilon c)$
$= Rb [\epsilon \cos(\epsilon - \epsilon c) - \sin(\epsilon - \epsilon c)]$ b. $y_B = Ok = Mi + ik - MO$
$= Rb \cos(\epsilon - \epsilon c) + BD \sin(\epsilon - \epsilon c) - Rb$
$= Rb \cos(\epsilon - \epsilon c) + \epsilon Rb \sin(\epsilon - \epsilon c) - Rb$
$= Rb[\cos(\epsilon - \epsilon c) + \epsilon \sin(\epsilon - \epsilon c) - 1]$ wherein
$Rb$ = base circle radius
$\epsilon$ = roll angle at point B
$\epsilon c$ = roll angle at point A Using the Pythagorean theorem, it may be found that:

$$OB = Rb \sqrt{2 + \epsilon^2 - 17 \, 2[\cos(\epsilon - \epsilon c) + \epsilon \sin(\epsilon - \epsilon c)]}$$

Since $OC = OA = OQ = Rb\epsilon C$, it may be found that:

$$CB = Rb \sqrt{2 + \epsilon^2 - 2[\cos(\epsilon - \epsilon c) + \epsilon \sin(\epsilon - \epsilon c)]} - \epsilon c$$

Let us now express CB as a non-dimensional function of the pitch diameter D and call it ERR. Since $D = (N/P)$ wherein N is the number of the teeth of the gear and the P the diametral pitch, and that $Rb = (N/2P) \cos\phi_c$, wherein $\phi_c$ is the pressure angle, we find that:

$$ERR = (1/2) \cos \phi_c \sqrt{2 + \epsilon^2 - 2[\cos(\epsilon - \epsilon c) + \epsilon \sin(\epsilon - \epsilon c)]} - \epsilon c$$

In practice, the compensating cam is built for a given $N_1$ and $P_1$ and its actual rise $CB_1$ is:

$$CB_1 = D_1 (ERR)$$

When checking a workpiece for $N_2$ different from $N_1$ and $P_2$ different from $P_1$ the cam rise should be:

$$CB_2 = D_2 (ERR)$$

thus $$(CB_2/CB_1 = [D_2 (ERR)/D_1 (ERR)] = [D_2/D_1]$$

$$CB_2 = (D_2/D_1) CB_1$$

The actual rise of the cam has thus to be multiplied electrically by a factor equal to $D_2/D_1$. This factor my be easily taken into consideration in calibrating adder 13 (FIG. 1) prior to testing each gear.

It is therefore seen that the non-dimensional error ERR is the same for gears of all dimensions. For example, if we assume that $\phi_c = 20°$, $\epsilon c$ may be found as follows:

$$\epsilon c = (OQ/Rb) = (OA/Rb) = tg \, \phi_c = tg \, 20° = 0.3697$$
radian or 20.8538°.

From the above, it will be clearly understood that to each value $\epsilon$ will correspond a single value ERR. Consequently, the rise of the cam may be evaluated for each value of angle $\epsilon$.

Figure 3:
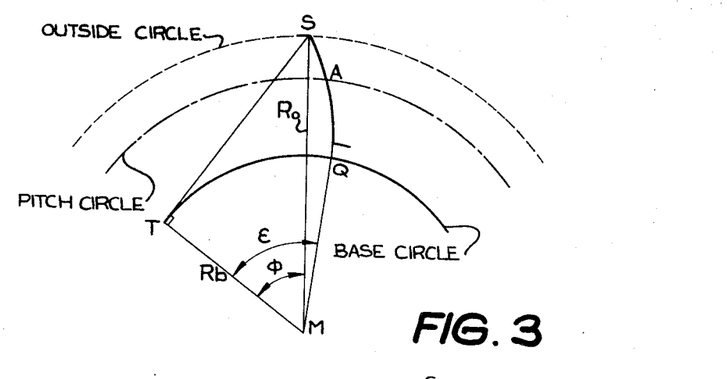

Referring now to FIG. 3, it will be seen that the maximum rool angle $\epsilon_{max}$ will be:

$$\epsilon_{max} = (TQ/Rb) = (TS/Rb) = tg \, \phi = \sqrt{(Ro^2 - Rb^2/Rb)}$$

wherein
$Ro = (N + 2/2P)$ = outside radius as commonly known $$Rb = (N/2P) \cos \phi_c = (N/2P) \cos 20° = 0.469845 (N/P)$$

Hence, $$\epsilon_{max} = \frac{\sqrt{\left(1+\frac{2}{N}\right)^2 - \cos^2 20°}}{\cos 20°}$$

Figure 4:
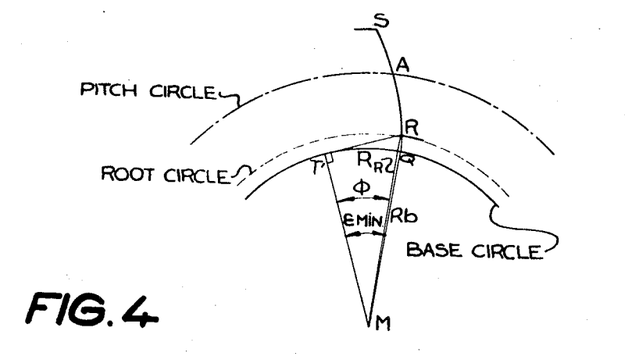

Referring to FIG. 4, the minimum roll angle $\epsilon_{min}$ will be:

$$\epsilon_{min} = (QT'/Rb) = (T'R/Rb) = tg \, \phi = \sqrt{(R_R^2 - Rb^2/Rb)}$$

wherein $R_R = (N - 2.5/2P)$ = root radius as commonly known $$Rb = (N/2P) \cos 20°$$

Hence, $$\epsilon_{min} = \sqrt{\frac{\left(1-\frac{2.5}{N}\right)^2 - \cos^2 20°}{\cos 20°}}$$

Referring back to FIG. 2, it will be seen that $\beta$ hereinafter called "sweep angle" may be calculated as follows:

$$tg\beta = [y_B/x_B] = [\cos(\epsilon - \epsilon c) + \epsilon \sin(\epsilon - \epsilon c) - 1/\epsilon \cos(\epsilon - \epsilon c) - \sin(\epsilon - \epsilon c)]$$

It will be easily seen that the sweep angle $\beta$ is a function of $\epsilon$ and, since $\epsilon$ is a function of the number of teeth N, as seen above, $\beta$ is also a function of the number of teeth N. If we assume that $N \geq 50$, such as it is the case for the gears that may be advantageously measured with the present apparatus we find that:
$\beta_{max} = 0.1269$ radian or 7.2726°
$\beta_{min} = 0.1517$ radian or 8.6918°.

Figure 5:
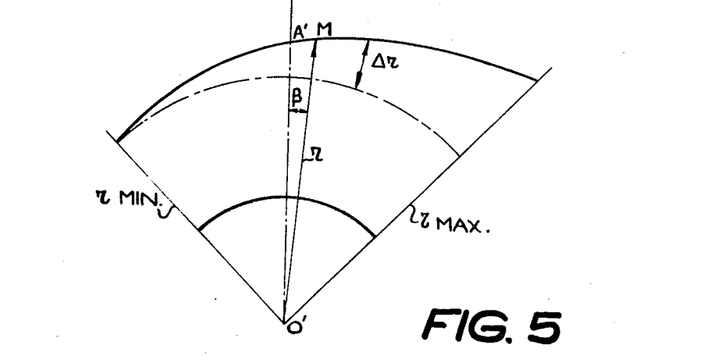

Referring now to FIG. 5, there is shown a diagram of a suitable cam wherein:
$M$ = a point of the profile of the cam;
$r$ = radius of the cam at point $M$;

$r_{min}$ = minimum radius of the cam;
$r_{max}$ = maximum radius of the cam;
$\Delta r = r - r_{min}$;
$\beta$ = sweep angle;
$A'$ = point corresponding to point $A$ of the pitch circle.

It will be easily understood that each point of the profile of the cam may be represented by sweep angle $\beta$ and by radius $r$. The values $\Delta R$ representing the rise of the cam are those represented by ERR as determined above for each value of angle $\beta$.

It has been found in practice that, for a gear having a number of teeth equal to 50, $\beta_{max} - \beta_{min} \cong 16°$. Therefore, the angular width of the cam is too small and it is preferable to increase such width by a factor 5, for example, and to use reducing gears such as mentioned previously (gears 16 and 17, FIG. 1).

It will also be understood that, since the transducers used are calibrated, the rise of the cam may be increased at will to facilitate fabrication thereof. The final cam which is to be used in practice has therefore the shape illustrated in FIG. 5.

The apparatus in accordance with the invention will now be disclosed with reference to a preferred embodiment thereof illustrated in FIGS. 6 to 12 and used for testing a segment 22 of a gear which, for the purpose of the present description, rests on three adjustable legs 24 which in turn bear on a preferably flat surface 26 and permit to position segment 22 of the gear in a true plane. Although only a segment 22 of a gear is shown, it is to be understood that the apparatus may be used to test a full gear.

The testing apparatus comprises a first arm 28 and a second arm 30 which is pivotally mounted on such first arm at point O as indicated in the diagram of FIG. 1. The first arm 28 comprises two rods 28a and 28b to which is secured, at one end thereof, a supporting structure 32 holding arm 30 and other devices to be disclosed later.

Rods 28a and 28b are held parallel to each other at the other end by clamp 34 which is tightened to rods 28a and 28b by screws 36.

Figure 9:
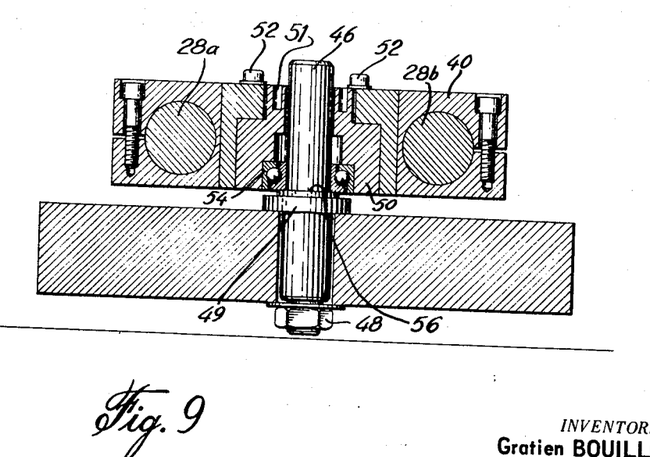
FIG. 9 illustrates a section view through line 9—9 of FIG. 7.

The rods 28a and 28b are slidably mounted, by means of an adjusting screw 38, within an H-shaped block member 40 which is pivotally attached to a supporting structure 42 resting on three legs 44 permitting to position such supporting member in a true plane. Referring more particularly to FIG. 9, a shaft 46 is secured to supporting structure 42 by means of nut 48 permitting tightening of shaft 46 against a shoulder 49 of the shaft. An eccentric bushing 50 is secured to H member 40 by means of bolts 52 protruding through slots 53 in H member 40. Holes 51 are provided in eccentric bushing 50 for angular positioning of the bushing within H member 40. A ball bearing 54 is rotated within bushing 50 and permits rotation of H member 40 with respect to the shaft 46. The ball bearing 54 rests on a shoulder 56 of the shaft 46 and thus supports the H member 40.

Figure 7:
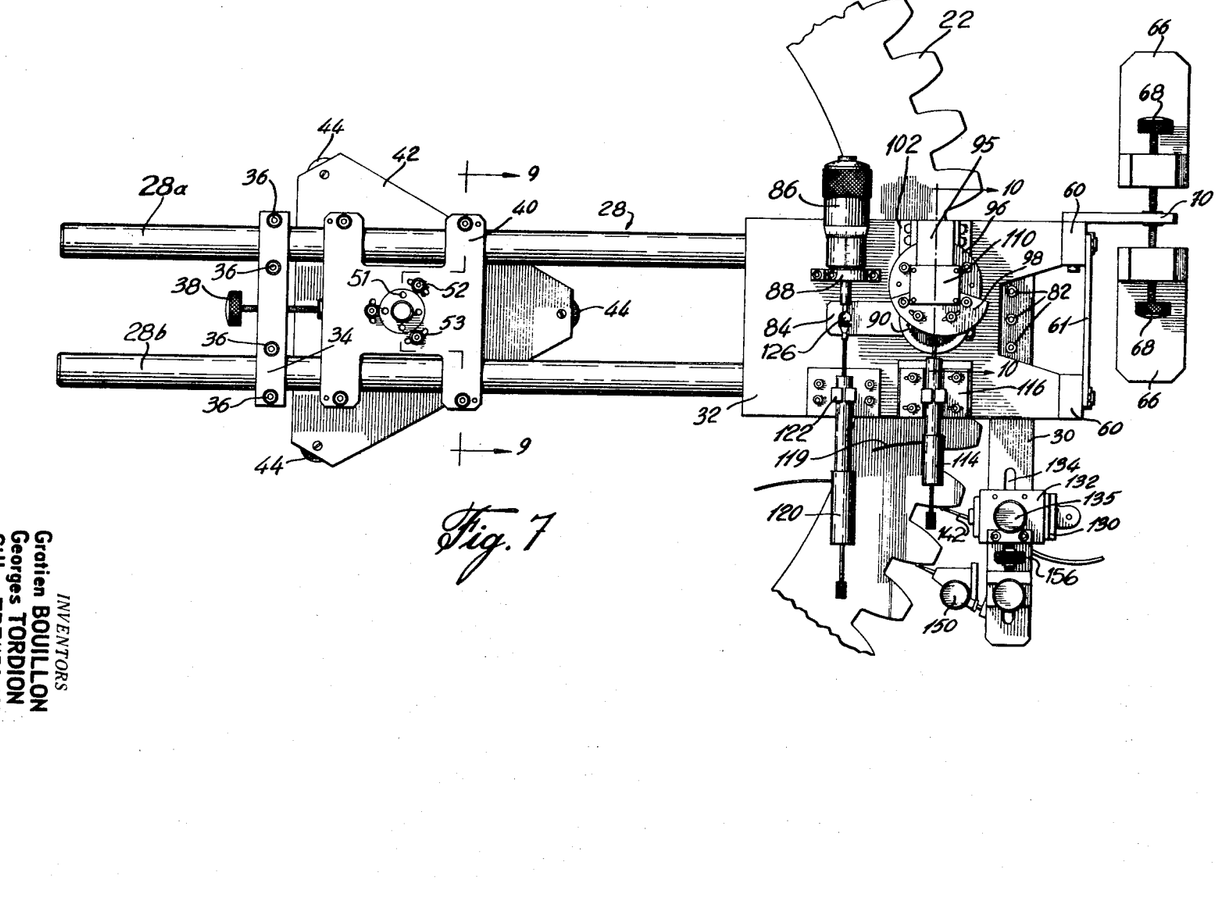
FIG. 7 illustrates a top view of the apparatus of FIG. 6.
Figure 8:
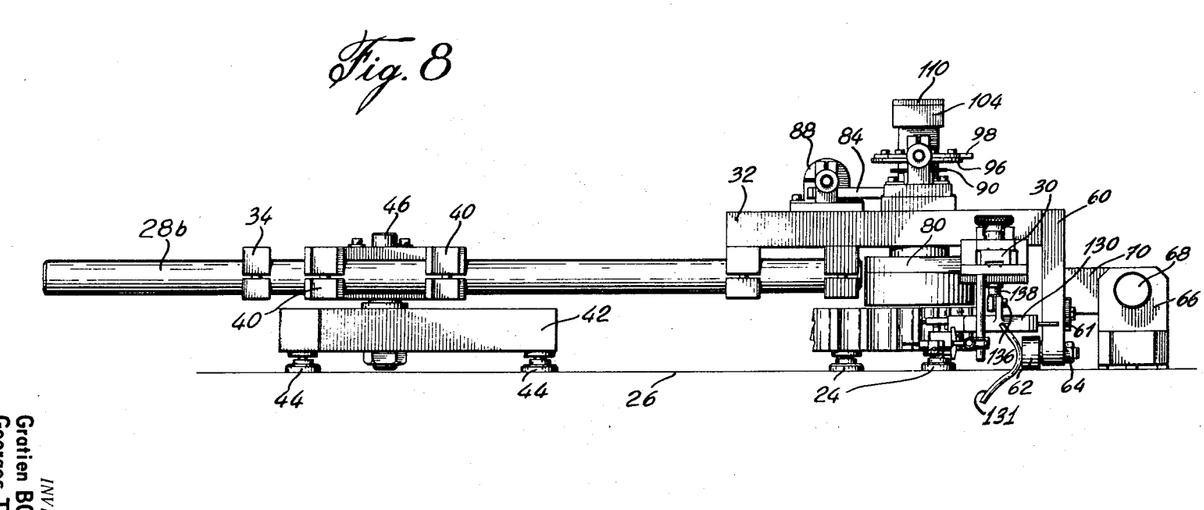
FIG. 8 illustrates a side view of the apparatus of FIG. 6.

Referring more particularly to FIGS. 7 and 8, the supporting structure 32 includes two leg members 60 secured thereto and maintained in parallel relationship by cross member 61. At the lower end of leg members 60 are attached rollers 62 which bear on surface 26 and the fixed portion of each being secured to one leg member 60 by means of a bolt 64. The rollers of leg members 60 permit to pivot arm 28 around shaft 46 which, let us mention it now, is located at the center of the gear to be tested. In addition, the height of leg members 60 is such as to maintain arm 28 parallel with surface 26 and to ensure free rotation of the supporting structure 32 above the gear segment 22. The supporting structure 32 may be locked in position by means of locking members 66 which may be removably secured to surface 26 by means of adhesive material. The locking members 66 are removably secured to the surface 26 because the supporting structure 32 is rotated about shaft 46 each time a successive tooth is tested. Locking members 66 are equipped with adjusting screws 68 adapted to contact a plate 70 secured to supporting structure 32.

Figures 10, 10A:
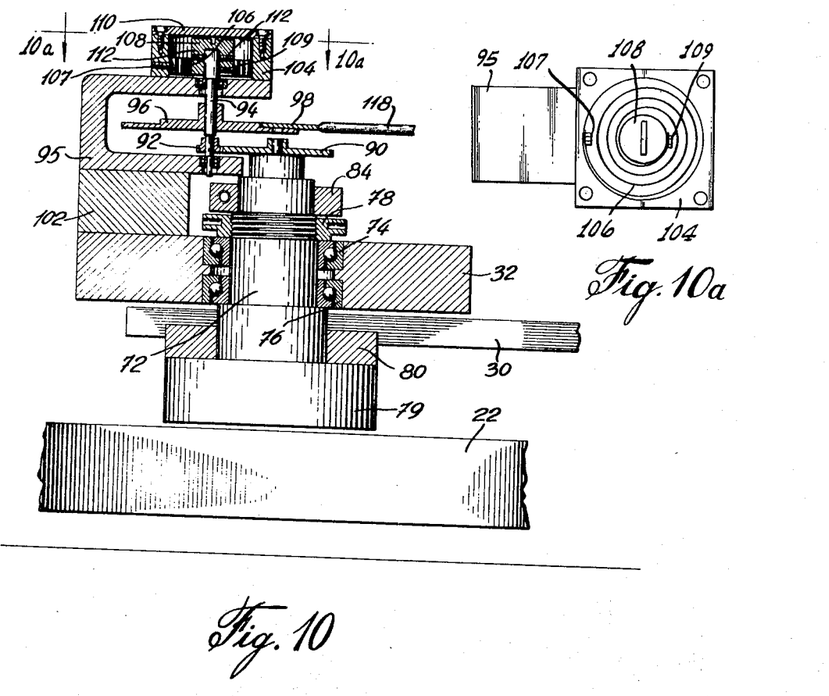
FIG. 10 illustrates a section view through line 10—10 of FIG. 7.
FIG. 10a illustrates a section view through line 10a – 10a of FIG. 10.

Referring more particularly to FIGS. 8 and 10, a shaft 72 is rotatably mounted on supporting structure 32 by means of two bearings 74 and 76. The shaft 72 is threaded and such threads are engaged by a nut 78 permitting to rotatably secure the shaft on the supporting structure 32. The lower end of the shaft 72 has a head portion 79 supporting an apertured plate 80 extending towards leg members 60 and carrying the above-mentioned second arm 30 which is secured to plate 80 by means of bolts 82 shown in FIG. 7. Plate 80 is keyed to shaft 72 and rotates therewith.

Figure 6:
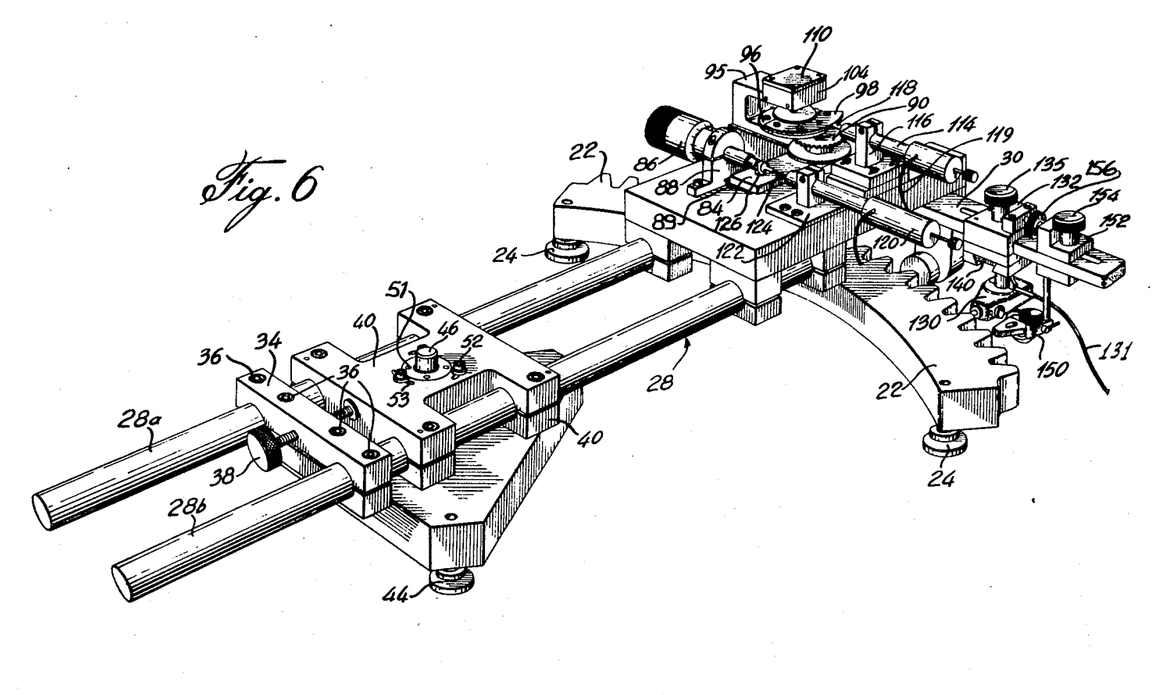
FIG. 6 illustrates a perspective view of a preferred embodiment of the invention.
Figure 12:
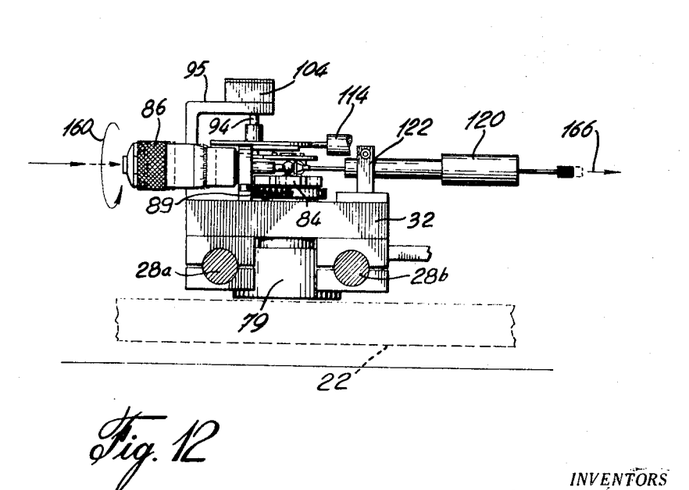

A second apertured plate 84 is keyed to the upper end of shaft 72 and is adapted to impart rotation to the shaft 72 by operating a micrometer 86 secured to the upper end of supporting structure 32 by means of bracket 88 as illustrated in FIGS. 6 and 7. Plate 84 is biased against the stem of micrometer 86 by spring 89 tensioned between bracket 88 and plate 84 as illustrated in FIGS. 6 and 12.

Returning to FIG. 10, a gear 90 corresponding to gear 17 in FIG. 1 is secured to the top end of shaft 72 and is coupled to a second gear 92 corresponding to gear 16 of FIG. 1. Gear 92 is keyed on a shaft 94 which is rotatably mounted within a C-shaped member 95. A disc 96 is also keyed to shaft 94 and a cam 98 corresponding to cam 14 of FIG. 1 is secured to disc 96. It will be easily seen that the rotation of shaft 72 will rotate gear 90 which in turn will rotate gear 92 and disc 96 upon which is mounted cam 98. The cam 98 will rotate a number of degrees which is directly proportional to the ratio of gears 90 and 92 for permitting more accurate readings of the apparatus as it was mentioned briefly in the first part of the description and will be disclosed more fully in a later part.

C-shaped member 95 is secured to supporting structure 32 by means of a spacer 102. On top of C-shaped member 95 is located box 104 housing a spring 106. Referring more particularly to FIG. 10a, spring 106 is secured at one end to the box 104 by screw 107 and at its other end to a block member 108 by screw 109. Block member 108 may be rotated with respect to shaft 94 to adjust the tension of spring 106 by means of a screw driver which may be introduced in a slot in the top of block member 108. Once proper tension is applied to spring 106, the block member 108 is secured in position by screws 112. The purpose of spring 106 is to maintain a torque between box 104 secured to member 95 and the shaft 94 rotatably mounted in member 95 to eliminate back-lash between gear 92 fixed to shaft 94 and gear 90 fixed to shaft 72.

A displacement transducer 114 corresponding to transducer 15 of FIG. 1 is mounted on a mounting bracket 116 secured to supporting structure 32. The transducer 114 includes a core 118 adapted to contact cam 98 and may be of any type known in the art. A suitable transducer may be a DC input, DC output linear voltage differential transformer (LVDT) providing a DC output proportional to linear displacement such as commercially available. The input and output leads of the transducer 114 are shown as forming part of a cable 119 in FIGS. 6 and 7 of the drawings.

A displacement transducer 120 corresponding to transducer 19 of FIG. 1 is mounted on a mounting bracket 122 secured to supporting structure 32. The transducer includes a core 124 contacting an abutment 126 of plate 84 and may be of the same type as transducer 114 disclosed above.

A commercially available side acting electrical gauge head 130 (apparatus 11 FIG. 1) having output lead 131 is attached to a mounting bracket 132 which is slidably mounted in a slot 134 of the arm 30. The mounting bracket is fixed in position guage an adjusting screw 135 which may be loosened for sliding bracket 132 and gauge head 130 secured thereto in the longitudinal direction of arm 30. The gauge head 130 is attached by a bolt 136 to a post 138 the upper portion of which slides into an undercut groove 140 of bracket 132. The gauge head is thus movable transversely with respect to arm 30 to adjust the position of the stylus 142 thereof so that a line passing through the measuring point of the tip of the probe of the gauge head and the center of shaft 72 will be parallel to the longitudinal axis of arm 30. The distance between the axis of shaft 72 and the front side of arm 30 (measured perpendicularly to arm 30) is a built in constant of the apparatus and a simple gage may be used for setting up the measuring point of the tip of the probe of the gauge head 130 at the same distance perpendicularly to the same side of arm 30.

A measuring apparatus 150 commonly called test indicator (apparatus 20 FIG. 1) is attached to a mounting bracket 152 which is also slidable with respect to arm 30 and may be fixed in position by screw 154. A differential adjusting screw 156 couples mounting bracket 132 and 152 for permitting fine adjustment of the position of the heads of guage head 130 and measuring apparatus 150 with respect to each other. As mentioned previously in connection with the description of FIG. 1 (element 20) measuring apparatus 150 is used as a stop or reference device to permit the measurement of the variation of the pitch of the gear teeth. It is provided with a dial (not shown) as illustrated schematically in FIG. 1 for indicating that the apparatus is properly set to take a measurement on a given gear tooth as it will be disclosed later.

The two arms 28 and 30 of the apparatus must be positioned at 90° from each other as mentioned in the description of FIG. 1 of the drawings. This may be done with any suitable measuring instrument prior to using the apparatus but this set up is normally done for the lift of the apparatus. One method of doing it is to set the same distance $L_1$ between axes 46 and 72 as between axis 72 and the measuring point of the tip of the probe of the gauge head 130 and by rotating arm 30 until the distance between the axis 46 and the measuring point of the tip of the probe of the gauge head 130 is $\sqrt{2} L_1$. This may be done using such instrument as gage blocks for setting the distance between axes 46 and 72 by measuring between the outside diameter of shaft 46 and the outside diameter of head portion 79 taking into consideration the fact that the radius of elements 46 and 79 is a built in constant of the apparatus. Similarly, gage blocks may be used for setting the same distance between axis 72 and the measuring point of the tip of the probe of the gauge head 130 by measuring the distance between the outside diameter of head portion 79 and the tip of the probe of the gauge head 130. In order to set up the two arms 28 and 30 at 90°, the distance $\sqrt{2} L_1$ between the axis 46 and the measuring point of the tip of the probe of the gauge head 130 may be measured using gage blocks placed between the tip of the probe of the gauge head 130 and the outside diameter of shaft 46 taking into account the radius of the shaft which, of course, is a built in constant of the apparatus and the fact that the measuring point of the tip of the probe of the gauge head 130 is located on a point of the outside diameter of the tip of the gauge head which is out of line with the direction of measurement (error of $R(1-\sqrt{2}/2)$ wherein R is the radius of the tip). Once this is done, the bracket 88 holding the micrometer is unclamped, the micrometer is turned until it indicates zero, and moved until its stem is in contact with abutment 126. The micrometer is then locked in position by tightening bracket 88. It will be understood that this setting is normally done only once in the life of the apparatus and that arm 30 will subsequently be set up to 90° every time the micrometer is turned to zero.

The above-described testing apparatus operates as follows:

First of all, the center of the gear is accurately found by any suitable method and the testing apparatus is positioned in such a way that the axis of shaft 46 coincides with the center of the gear.

Subsequently, the axis of rotation of shaft 72 is adjusted so as to coincide exactly with the point O illustrated in FIG. 1, which means that the length of arm 28 must be adjusted to correspond to the base radius of the gear. The distance between the axis of shaft 46 and 72 corresponding to the base radius may be measured by any suitable instrument and the length of arm 28 adjusted by screw 38 and eccentric bushing 50. Indeed, the distance between the axes of shafts 46 and 72 and the facing surfaces of elements 40 and 32 respectively is a built in constant of the apparatus. Consequently, the required distance $L_1$ between axes 46 and 72 may be set up accurately by measuring the distance between the facing surfaces of elements 40 and 32 using any suitable instrument such as an inside micrometer.

Subsequently, the distance between the axis of shaft 72 and the measuring point of the tip of the probe of gauge head 130 is set accurately, such distance being equal to Rg as indicated in FIG. 1 of the drawings. The setting of distance $R_o$ may be set in the same manner as mentioned above by measuring, with such instrument as gage blocks, the distance between the measuring point of the tip of the gauge head 130 and the outside diameter of head portion 79, taking into consideration the fact that the radius of element 79 is a built in constant of the apparatus. In addition, the distance between axis of shaft 72 and the measuring point of tip 142 and the facing surfaces of elements 32 and 132 respectively is a built in constant of the apparatus, when arm 30 is perpendicular to members 28. Consequently, the required distance $R_o$ between axes 72 and the measuring point of the probe 142 may be set up accurately by measuring the distance between the facing surfaces of elements 32 and 132 with such instrument as an inside micrometer.

Once all the adjustments have been made, the two arms 28 and 30 are at right angle and the micrometer 86 should be adjusted, if necessary, to indicate zero. The arm 28 is then displaced counterclockwise until the contact point of the probe of the gauge head 130 touches the side of the tooth on the pitch circle by rotating adjusting screws 68. The position of the stylus of measuring apparatus 150 is also adjusted so that it touches the following tooth on the pitch circle. This may be done by positioning the spherical tip of the measuring apparatus 150 in contact with the following tooth near the pitch point, making sure that the probe is near the mid position of its measuring range (zero setting). The member 32 is then rotated clockwise by means of adjusting screws 68 until the tip of the probe 142 of the gauge head 130 is between two given teeth. Then the distance between the tip of the probe 142 of the gauge head and the actual root circle between the two given teeth is measured and noted. The micrometer 86 is then rotated until the tip of the gauge head clears the outsidecircle of the gear. The locking members 66 are then removed and the supporting structure 32 is rotated counterclockwise on rollers 62 around shaft 46 until the probe of measuring apparatus 150 is located near the middle of the same two teeth. The micrometer 86 is then rotated until it reads zero and the distance measured above between the tip of the probe of the gauge head 130 and the root circle of the gear is set between the tip of the probe of measuring apparatus 150 and the root circle between the same two teeth. If the diameters of the tips are different, one must allow for the difference when setting said distance.

Figure 11:
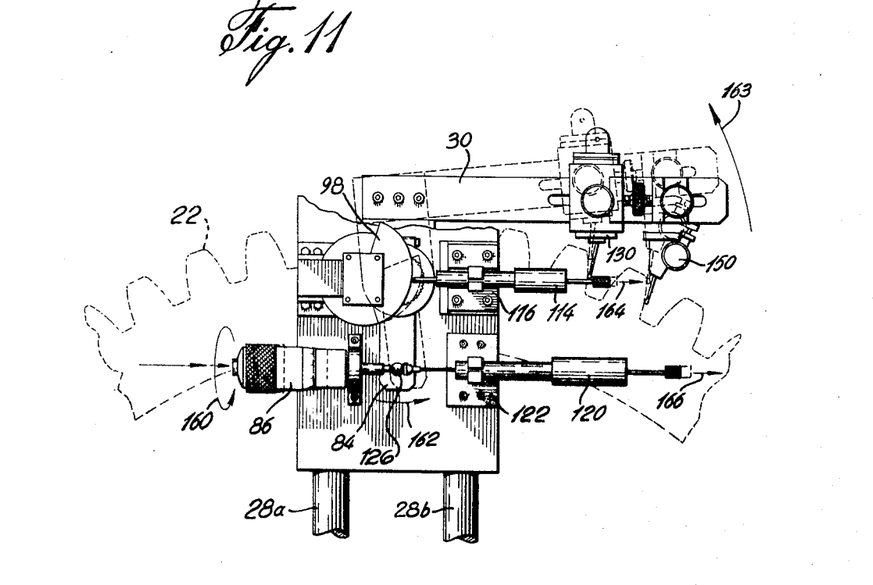
FIGS. 11 and 12 illustrate the operation of the apparatus in accordance with the invention.

The micrometer 86 is then rotated as illustrated in FIGS. 11 and 12 of the drawings by arrow 160 to test the portion of the gear tooth located between the pitch circle and the outside circle. The rotation of micrometer 86 will rotate plate 84 in the direction of arrow 162 and thus rotate shaft 72 and arm 30 secured thereto to the position illustrated in dashed lines in FIG. 11 of the drawings. The rotation of arm 30 in the direction of arrow 163 will cause the gauge head 130 to follow the actual involute line of the gear teeth and produce a signal corresponding to the difference between the profile of the involute gear tooth and the segment of the circle traced about the axis of shaft 72. The output of the gauge head will be fed to the adder 13 as mentioned previously in the description of FIG. 1.

The rotation of micrometer 86 in the direction of arrow 160 also causes the cam 98 to rotate clockwise because of the coupling of gears 90 and 92 to the position illustrated in dashed lines. This will move the core of displacement transducer 114 in the direction of arrow 164 and so produce the second signal fed to adder 13 disclosed in FIG. 1.

The rotation of micrometer 86 in the direction of arrow 160 also causes the core of displacement transducer 120 to move in the direction of arrow 166 and so generate a signal which is practically proportional to the rotation of shaft 72, which signal is applied to terminal X of the recorder as illustrated in FIG. 1.

It is to be understood that the rotation of the micrometer in the direction opposite to that represented by arrow 160 would permit to test the portion of the gear tooth located between the pitch circle and the root circle.

Before proceeding to the test of a successive tooth, the micrometer 86 is adjusted to read zero, both spherical tips of the probes of gauge head 130 and measuring apparatus 150 being placed in contact with their respective tooth flank, and a note is made of the reading of the measuring apparatus 150. Micrometer 86 is subsequently turned so as to move the arm 30 in the direction of arrow 163 in FIG. 11 so that the tips of the probes of gauge head 130 and measuring apparatus 150 clear the outside circle of the gear. The locking members 66 are then removed and the supporting structure 32 is rotated counterclockwise on rollers 62 around shaft 46 until the probes of 130 and 150 are respectively located somewhere near the middle of the next tooth spacing. The locking members 66 are then placed on each side of plate 70 and will lock plate 70 in position because the surface thereof in contact with the plane 26 is made of adhesive material. The micrometer 86 is then returned to its zero position and this automatically brings the tips of the probes of the gauge head 130 and measuring apparatus 150 back on the pitch circle. The adjusting screws 68 are then rotated until the tips of the probes of 130 and 150 respectively touch the flank of the next gear tooth. The adjusting screws 68 are then rotated until the reading on the dial of the measuring apparatus 150 is the same as noted before proceeding with the displacement of supporting structure 32 from the preceding tooth. This permits the measurement of the pitch variation on the recorder 18 (FIG. 1).

The following teeth of the gears are then tested one after the other and, for any given tooth, the profile error detected will appear as a deviation of a continuous trace from the horizontal on the recorder 18 of FIG. 1.

Since the distance between the first two teeth tested is taken as a reference by the adjustment of differential adjusting screw 156, any variation in the pitch of the gear teeth from such reference will appear as a vertical displacement of the whole profile trace on the X—Y recorder. This displacement can be measured at the point corresponding to the pitch point A of each tooth.

Although the invention has been disclosed with reference to a preferred embodiment thereof, it is to be understood that various modifications of such embodiment and of the shape of the elements thereof could be made without departing from the scope of the invention.

We claim :

1. An apparatus for testing simultaneously the profile and of the pitch of an involute gear tooth comprising:

a. means for pivoting an electrical gauge head contacting said involute gear tooth about a first pivot point common to the base circle of the gear and a line tangent to said base circle and intersecting the pitch circle of said gear on the surface of the gear tooth being measured, thus causing said gauge head to generate a first signal proportional to the difference between the actual profile of the involute gear tooth under test and a segment of a circle traced by said gauge head about said first pivot point;

b. means for generating a second signal proportional to the difference between the theoretical profile of the involute gear tooth and the segment of the circle traced about said pivot point; and c. means for subtracting said first signal from said second signal to provide a signal representing the true deviation of the profile of the involute gear tooth from the theoretical profile of the gear tooth.

2. An apparatus as defined in claim 1, wherein said means for pivoting said gauge head about said first pivot point includes a first arm having a length adjustable to the base circle radius of the gear and adapted to be pivoted at one end at the center of the gear, a second arm pivotally attached to said first arm at said first pivot point and carrying said gauge head at a distance from said pivot point corresponding to the length of the generating line of the involute at the pitch circle, and a micrometer in fixed relation with said first arm and engaging said second arm.

3. An apparatus as defined in claim 2, wherein said means for generating said second signal includes a cam rotatable with said second arm and having a profile corresponding, for each degree of rotation of said second arm, to the difference between the theoretical profile of the involute gear tooth and the segment of the circle traced by said second arm, and a first displacement transducer attached to said first arm adapted to contact said cam to generate said second signal.

4. An apparatus as defined in claim 3, further comprising a first gear mounted coaxially with said first pivot point on said second arm and rotatable with said second arm, and a second gear coupled to said first gear mounted on said first arm coaxial with and fixed with respect to said cam.

5. An apparatus as defined in claim 3, further comprising a second displacement transducer responsive to rotation of said second arm, and a X—Y recorder having one coordinate responsive to said subtracting means and the other coordinate responsive to said second transducer for recording the deviation of the involute gear tooth versus the sweep angle of said second arm.

6. An apparatus as defined in claim 2, further comprising a first supporting structure for said first arm, a pivot shaft secured to said supporting structure, and a member slidably attached to one end of said first arm and rotatably mounted on said shaft for permitting adjustment of the length of said first arm as well as pivotal movement of said first arm.

7. An apparatus as defined in claim 2, wherein said gauge head is slidably mounted on said second arm with securing means to fix said gauge head in any one of a plurality of positions.

8. An apparatus as defined in claim 2, further comprising a measuring apparatus mounted on said second arm for detecting any variation in the pitch of said gear tooth.

9. An apparatus as defined in claim 4, further comprising a second supporting structure secured to the other end of said first arm, a second shaft rotatably mounted on said second supporting structure at said first pivot point and supporting said second arm and said first gear.

10. An apparatus as defined in claim 9, further comprising a third shaft rotatably mounted on said second supporting structure and upon which is secured said second gear, and a disc carrying said cam secured to said third shaft.

11. An apparatus as defined in claim 9, wherein the first displacement transducer is mounted on said second supporting structure.

12. An apparatus as defined in claim 9, further comprising an apertured plate secured to said second shaft and adapted to be contacted by said micrometer for rotating said second shaft.

13. An apparatus as defined in claim 12, further comprising a second displacement transducer secured to said second supporting structure and contacting said apertured plate, thus generating a signal responsive to rotation of said plate.

* * * * *